US012732969B2

(12) United States Patent
Tian et al.

(10) Patent No.: US 12,732,969 B2
(45) Date of Patent: Sep. 8, 2026

(54) RESOURCE SENSING METHOD, TERMINAL, AND COMPUTER-READABLE STORAGE MEDIUM

(71) Applicant: DATANG MOBILE COMMUNICATIONS EQUIPMENT CO., LTD., Beijing (CN)

(72) Inventors: Yan Tian, Beijing (CN); Shupeng Li, Beijing (CN); Xiaotao Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 296 days.

(21) Appl. No.: 18/294,501

(22) PCT Filed: Jun. 7, 2022

(86) PCT No.: PCT/CN2022/097332
§ 371 (c)(1),
(2) Date: Feb. 1, 2024

(87) PCT Pub. No.: WO2023/020077
PCT Pub. Date: Feb. 20, 2023

(65) Prior Publication Data

US 2024/0323918 A1 Sep. 26, 2024

(30) Foreign Application Priority Data

Aug. 16, 2021 (CN) ......................... 202110936764.1

(51) Int. Cl.
*H04W 72/00* (2023.01)
*H04W 28/26* (2009.01)
(Continued)

(52) U.S. Cl.
CPC ........... *H04W 72/02* (2013.01); *H04W 28/26* (2013.01); *H04W 72/25* (2023.01); *H04W 92/18* (2013.01)

(58) Field of Classification Search
CPC ..... H04W 72/02; H04W 72/25; H04W 28/26; H04W 92/18
See application file for complete search history.

(56) References Cited

U.S. PATENT DOCUMENTS 11,057,870 B2 * 7/2021 Huang .................. H04W 72/02
12,150,097 B2 * 11/2024 Ko ........................ H04W 72/25
(Continued)

FOREIGN PATENT DOCUMENTS

CN 111901783 A 11/2020
CN 112272397 A 1/2021
(Continued)

OTHER PUBLICATIONS

International Search Report for International Patent Application No. PCT/CN2022/097332 issued by the International Patent Office on Aug. 30, 2022, and its English translation provided by WIPO.
(Continued)

*Primary Examiner* — Khai M Nguyen
(74) *Attorney, Agent, or Firm* — Ladas & Parry, LLP

(57) ABSTRACT

A resource sensing method, a terminal, and a computer readable storage medium are provided, and belong to the communications field. The method includes: receiving resource-pool related configuration from a network device by a terminal; determining, by the terminal according to the resource-pool related configuration, one or more target sensing modes of resource reservation for one or more target TBs, and one or two resource selection windows corresponding to the one or more target sensing modes.

18 Claims, 2 Drawing Sheets

(51) Int. Cl.

| | |
|---|---|
| ***H04W 72/02*** | (2009.01) |
| ***H04W 72/25*** | (2023.01) |
| *H04W 92/18* | (2009.01) |

(56) References Cited

U.S. PATENT DOCUMENTS

| | | | | |
|---|---|---|---|---|
| 2021/0007096 | A1* | 1/2021 | Huang | H04L 1/1887 |
| 2021/0266921 | A1 | 8/2021 | Wang et al. | |
| 2022/0353650 | A1* | 11/2022 | Aldana | H04W 12/069 |
| 2023/0143979 | A1 | 5/2023 | Luo et al. | |
| 2023/0403681 | A1* | 12/2023 | Wen | H04W 72/02 |
| 2024/0421931 | A1* | 12/2024 | Parkvall | H04B 7/0452 |

FOREIGN PATENT DOCUMENTS

| | | | |
|---|---|---|---|
| CN | 112425233 | A | 2/2021 |
| CN | 112788622 | A | 5/2021 |
| WO | 2020017939 | A1 | 1/2020 |

OTHER PUBLICATIONS

Written Opinion for International Patent Application No. PCT/CN2022/097332 issued by the International Patent Office on Aug. 30, 2022, and its English translation provided by WIPO.

International Preliminary report on Patentability for International Patent Application No. PCT/CN2022/097332 issued by the International Patent Office on Feb. 13, 2024 and its English translation provided by WIPO.

Supplementary European Search Report in the corresponding EP Patent Application No. 22857391.1, issued on Nov. 28, 2024.

“Sidelink resource allocation to reduce power consumption” 3GPP TSG RAN WG1 Meeting #105-e, R1-2104236, Huawei, HiSilicon, May 12, 2021.

“Sidelink Resource Allocation for Power Saving,” 3GPP TSG RAN WG1 #106-e, R1-2107760, Apple, Aug. 7, 2021.

* cited by examiner

RESOURCE SENSING METHOD, TERMINAL, AND COMPUTER-READABLE STORAGE MEDIUM

CROSS-REFERENCE TO RELATED APPLICATIONS

This application is a U.S. national phase application of a PCT Application No. PCT/CN2022/097332 filed on Jun. 7, 2022, which claims priority to a Chinese Patent Application No. 202110936764.1 filed on Aug. 16, 2021, the disclosures of which are incorporated herein by reference in their entireties.

TECHNICAL FIELD

Embodiments of the present disclosure relate to the technical field of communications, and in particular, relates to a resource sensing method, a terminal, and a computer-readable storage medium.

BACKGROUND

In the related art, in a New Radio Vehicle-to Everything Mode 2 (NR V2X Mode 2) distributed resource scheduling system, two sensing operations including Period-based Partial Sensing (PBPS) and Contiguous Partial Sensing (CPS) are performed at the same time, and configuration of a resource selection window and configuration of a candidate resource set are not limited, a result of which is a sufficient number of resources cannot be ensured, and resource collision is easily caused.

SUMMARY

An objective of the embodiments of the present disclosure is to provide a resource sensing method, a terminal, and a computer-readable storage medium, which can solve the problem that current configuration of a resource selection window and current configuration of a candidate resource set cannot ensure a sufficient number of resources, causing resource collision.

In a first aspect, a resource sensing method is provided. The method includes:

- receiving resource-pool related configuration from a network device by a terminal;
- determining, by the terminal according to the resource-pool related configuration, one or more target sensing modes of resource reservation for one or more target Transport Blocks (TBs), and one or two resource selection windows corresponding to the one or more target sensing modes.

Optionally, the one or more target TBs include a TB of a periodic service and/or a TB of a non-periodic service, and the one or more target sensing modes include PBPS and CPS; and the method further includes:

- determining, by the terminal, a candidate resource set in the one or two resource selection windows.

Optionally, the resource-pool related configuration includes:

- first information configured to indicate a first resource pool;
- second information configured to indicate that the first resource pool is allowed for resource sensing performed by using the PBPS and/or the CPS;

- third information configured to indicate that a quantity of resource selection windows allowed to be configured for the first resource pool is one or two.

Optionally, determining, by the terminal according to the resource-pool related configuration, the one or more target sensing modes of resource reservation for the one or more target TBs and the one or two resource selection windows corresponding to the one or more target sensing modes includes any one of following: in case that the one or more target TBs include the TB of the periodic service, determining, by the terminal according to the resource-pool related configuration, that one or more target sensing modes of resource reservation performed on the TB of the periodic service are the PBPS, and determining a first resource selection window corresponding to the PBPS;

- in case that the one or more target TBs include the TB of the non-periodic service, determining, by the terminal according to the resource-pool related configuration, that one or more target sensing modes of resource reservation performed on the TB of the non-periodic service are the CPS, and determining a first resource selection window corresponding to the CPS;
- in case that the one or more target TBs include the TB of the periodic service, determining, by the terminal according to the resource-pool related configuration, that one or more target sensing modes of resource reservation performed on the TB of the periodic service are the PBPS and the CPS, and determining a first resource selection window corresponding to the PBPS and the CPS;
- in case that the one or more target TBs include the TB of the non-periodic service, determining, by the terminal according to the resource-pool related configuration, that the one or more target sensing modes of resource reservation performed for the TB of the non-periodic service are the PBPS and the CPS, and determining a first resource selection window corresponding to the PBPS and the CPS;
- in case that the one or more target TBs include the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and the CPS;
- in case that the one or more target TBs include the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and a second resource selection window corresponding to the CPS.

Optionally, determining, by the terminal, the candidate resource set in one resource selection window includes:

- sending a first parameter to a physical layer of the terminal by a higher layer of the terminal;
- determining a first resource set in a first resource selection window according to the first parameter by the physical layer of the terminal;

performing resource sensing on the first resource set by means of the one or more target sensing modes by the terminal and determining a first candidate resource set, wherein the first parameter is a minimum value of amounts of subframes in the first resource set, the first parameter is any one parameter of the first parameter set, and the first parameter set is pre-configured by the network device.

Optionally, determining, by the terminal, the candidate resource set in two resource selection windows includes:

sending a first parameter and a second parameter to a physical layer of the terminal by a higher layer of the terminal;

determining, by the physical layer of the terminal, a first resource set in a first resource selection window according to the first parameter, and determining a second resource set in a second resource selection window according to the second parameter;

performing resource sensing on the first resource set to determine a first candidate resource set, and performing resource sensing on the second resource set to determine a second candidate resource set, by means of the one or more target sensing modes by the terminal, wherein the first parameter is a minimum value of amounts of subframes in the first resource set, the second parameter is a minimum value of amounts of subframes in the second resource set, the first parameter is any one parameter of the first parameter set, the second parameter is any one parameter of the second parameter set, and the first parameter set and the second parameter set are two sets pre-configured by the network device.

Optionally, determining, by the terminal, the candidate resource set in two resource selection windows includes:

sending a third parameter to a physical layer of the terminal by a higher layer of the terminal;

determining a first resource set in a first resource selection window and a second resource set in a second resource selection window according to the third parameter by the physical layer of the terminal;

performing resource sensing on the first resource set to determine a first candidate resource set, and performing resource sensing on the second resource set to determine a second candidate resource set, by means of the one or more target sensing modes by the terminal, wherein the third parameter is any one parameter of a third parameter set, and the third parameter set is a set preconfigured by the network device.

Optionally, the method further includes:

determining an order of the first resource selection window and an order of the second resource selection window by the terminal, and/or determining a size of the first resource selection window and a size of the second resource selection window by the terminal.

Optionally, receiving the resource-pool related configuration from the network device by the terminal includes:

receiving a Proximity Communication 5 Radio Resource Control (PC5 RRC) signaling from the network device by the terminal, wherein the PC5 RRC signaling carries the resource-pool related configuration;

sending higher layer signaling to a physical layer of the terminal by a higher layer of the terminal, wherein the higher layer signaling carries the resource-pool related configuration.

In a second aspect, a terminal is provided. The terminal includes:

a memory, a transceiver, a processor, wherein the memory is configured to store a computer program, the transceiver is configured to send and receive data under control of the processor, and the processor is configured to read the computer program in the memory and execute following:

receiving resource-pool related configuration from a network device by the terminal;

determining, by the terminal according to the resource-pool related configuration, one or more target sensing modes of resource reservation for one or more target Transport Blocks (TBs), and one or two resource selection windows corresponding to the one or more target sensing modes.

Optionally, the one or more target TBs include a TB of a periodic service and/or a TB of a non-periodic service, and the one or more target sensing modes include Period-based Partial Sensing (PBPS) and Contiguous Partial Sensing (CPS); and the processor is configured to read the computer program in the memory and execute further following:

determining, by the terminal, a candidate resource set in the one or two resource selection windows.

Optionally, the resource-pool related configuration includes:

first information configured to indicate a first resource pool;

second information configured to indicate that the first resource pool is allowed for resource sensing performed by using the PBPS and/or the CPS;

third information configured to indicate that a quantity of resource selection windows allowed to be configured for the first resource pool is one or two.

Optionally, the processor is configured to read the computer program in the memory and execute further following:

in case that the one or more target TBs include the TB of the periodic service, determining, by the terminal according to the resource-pool related configuration, that one or more target sensing modes of resource reservation performed on the TB of the periodic service are the PBPS, and determining a first resource selection window corresponding to the PBPS;

in case that the one or more target TBs include the TB of the non-periodic service, determining, by the terminal according to the resource-pool related configuration, that one or more target sensing modes of resource reservation performed on the TB of the non-periodic service are the CPS, and determining a first resource selection window corresponding to the CPS;

in case that the one or more target TBs include the TB of the periodic service, determining, by the terminal according to the resource-pool related configuration, that one or more target sensing modes of resource reservation performed on the TB of the periodic service are the PBPS and the CPS, and determining a first resource selection window corresponding to the PBPS and the CPS;

in case that the one or more target TBs include the TB of the non-periodic service, determining, by the terminal according to the resource-pool related configuration, that the one or more target sensing modes of resource reservation performed for the TB of the non-periodic service are the PBPS and the CPS, and determining a first resource selection window corresponding to the PBPS and the CPS;

in case that the one or more target TBs include the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and the CPS;

in case that the one or more target TBs include the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and a second resource selection window corresponding to the CPS.

Optionally, the processor is configured to read the computer program in the memory and execute further following:

sending a first parameter to a physical layer of the terminal by a higher layer of the terminal;

determining a first resource set in a first resource selection window according to the first parameter by the physical layer of the terminal;

performing resource sensing on the first resource set by means of the one or more target sensing modes by the terminal and determining a first candidate resource set, wherein the first parameter is a minimum value of amounts of subframes in the first resource set, the first parameter is any one parameter of the first parameter set, and the first parameter set is pre-configured by the network device.

Optionally, the processor is configured to read the computer program in the memory and execute further following:

sending a first parameter and a second parameter to a physical layer of the terminal by a higher layer of the terminal;

determining, by the physical layer of the terminal, a first resource set in a first resource selection window according to the first parameter, and determining a second resource set in a second resource selection window according to the second parameter;

performing resource sensing on the first resource set to determine a first candidate resource set, and performing resource sensing on the second resource set to determine a second candidate resource set, by means of the one or more target sensing modes by the terminal, wherein the first parameter is a minimum value of amounts of subframes in the first resource set, the second parameter is a minimum value of amounts of subframes in the second resource set, the first parameter is any one parameter of the first parameter set, the second parameter is any one parameter of the second parameter set, and the first parameter set and the second parameter set are two sets pre-configured by the network device.

Optionally, the processor is configured to read the computer program in the memory and execute further following:

sending a third parameter to a physical layer of the terminal by a higher layer of the terminal;

determining a first resource set in a first resource selection window and a second resource set in a second resource selection window according to the third parameter by the physical layer of the terminal;

performing resource sensing on the first resource set to determine a first candidate resource set, and performing resource sensing on the second resource set to determine a second candidate resource set, by means of the one or more target sensing modes by the terminal, wherein the third parameter is any one parameter of a third parameter set, and the third parameter set is a set preconfigured by the network device.

Optionally, the processor is configured to read the computer program in the memory and execute further following:

determining an order of the first resource selection window and an order of the second resource selection window by the terminal, and/or determining a size of the first resource selection window and a size of the second resource selection window by the terminal.

Optionally, the processor is configured to read the computer program in the memory and execute further following:

receiving a Proximity Communication 5 Radio Resource Control (PC5 RRC) signaling from the network device by the terminal, wherein the PC5 RRC signaling carries the resource-pool related configuration;

sending higher layer signaling to a physical layer of the terminal by a higher layer of the terminal, wherein the higher layer signaling carries the resource-pool related configuration.

In a third aspect, a terminal is provided. The terminal includes:

a receiving module, configured to receive a resource-pool related configuration from a network device by the terminal; and a first determination module, configured to determine, by the terminal according to the resource-pool related configuration, one or more target sensing modes of resource reservation for one or more target Transport Blocks (TBs), and one or two resource selection windows corresponding to the one or more target sensing modes.

Optionally, the terminal further includes:

a second determination module, configured to determine, by the terminal, a candidate resource set in the one or two resource selection windows, wherein the one or more target TBs include a TB of a periodic service and/or a TB of a non-periodic service, and the one or more target sensing modes include PBPS and CPS.

Optionally, the resource-pool related configuration includes:

first information configured to indicate a first resource pool;

second information configured to indicate that the first resource pool is allowed for resource sensing performed by using the PBPS and/or the CPS;

third information configured to indicate that a quantity of resource selection windows allowed to be configured for the first resource pool is one or two.

Optionally, the first determination module is further configured to perform any one of following in case that the one or more target TBs include the TB of the periodic service, determining, by the terminal according to the resource-pool related configuration, that one or more target sensing modes of resource reservation performed on the TB of the periodic service are the PBPS, and determining a first resource selection window corresponding to the PBPS;

in case that the one or more target TBs include the TB of the non-periodic service, determining, by the terminal according to the resource-pool related configuration, that one or more target sensing modes of resource reservation performed on the TB of the non-periodic service are the CPS, and determining a first resource selection window corresponding to the CPS;

in case that the one or more target TBs include the TB of the periodic service, determining, by the terminal according to the resource-pool related configuration, that one or more target sensing modes of resource reservation performed on the TB of the periodic service are the PBPS and the CPS, and determining a first resource selection window corresponding to the PBPS and the CPS;

in case that the one or more target TBs include the TB of the non-periodic service, determining, by the terminal according to the resource-pool related configuration, that the one or more target sensing modes of resource reservation performed for the TB of the non-periodic service are the PBPS and the CPS, and determining a first resource selection window corresponding to the PBPS and the CPS;

in case that the one or more target TBs include the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and the CPS;

in case that the one or more target TBs include the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and a second resource selection window corresponding to the CPS.

Optionally, the second determination module is further configured to perform following:

sending a first parameter to a physical layer of the terminal by a higher layer of the terminal;

determining a first resource set in a first resource selection window according to the first parameter by the physical layer of the terminal;

performing resource sensing on the first resource set by means of the one or more target sensing modes by the terminal and determining a first candidate resource set, wherein the first parameter is a minimum value of amounts of subframes in the first resource set, the first parameter is any one parameter of the first parameter set, and the first parameter set is pre-configured by the network device.

Optionally, the second determination module is further configured to perform following:

sending a first parameter and a second parameter to a physical layer of the terminal by a higher layer of the terminal;

determining, by the physical layer of the terminal, a first resource set in a first resource selection window according to the first parameter, and determining a second resource set in a second resource selection window according to the second parameter;

performing resource sensing on the first resource set to determine a first candidate resource set, and performing resource sensing on the second resource set to determine a second candidate resource set, by means of the one or more target sensing modes by the terminal, wherein the first parameter is a minimum value of amounts of subframes in the first resource set, the second parameter is a minimum value of amounts of subframes in the second resource set, the first parameter is any one parameter of the first parameter set, the second parameter is any one parameter of the second parameter set, and the first parameter set and the second parameter set are two sets pre-configured by the network device.

Optionally, the second determination module is further configured to perform following:

sending a third parameter to a physical layer of the terminal by a higher layer of the terminal;

determining a first resource set in a first resource selection window and a second resource set in a second resource selection window according to the third parameter by the physical layer of the terminal;

performing resource sensing on the first resource set to determine a first candidate resource set, and performing resource sensing on the second resource set to determine a second candidate resource set, by means of the one or more target sensing modes by the terminal, wherein the third parameter is any one parameter of a third parameter set, and the third parameter set is a set preconfigured by the network device.

Optionally, the terminal further includes a third determination module, configured to:

determine an order of the first resource selection window and an order of the second resource selection window by the terminal, and/or determine a size of the first resource selection window and a size of the second resource selection window by the terminal.

Optionally, the receiving module is further configured to:

receive a Proximity Communication 5 Radio Resource Control (PC5 RRC) signaling from the network device by the terminal, wherein the PC5 RRC signaling carries the resource-pool related configuration;

send higher layer signaling to a physical layer of the terminal by a higher layer of the terminal, wherein the higher layer signaling carries the resource-pool related configuration.

In a fourth aspect, a computer-readable storage medium is provided, wherein the computer-readable storage medium stores a computer program, the computer program is configured to cause a computer to execute the resource sensing method according to the first aspect.

In the embodiments of the present disclosure, the terminal determines, according to the resource-pool related configuration provided by the network side, a target sensing mode for performing resource reservation for the target TB, and one or two resource selection windows corresponding to the target sensing mode, thus flexibly configuring the number of resource selection windows for different scenes, ensuring sufficient candidate resources when reserving resources, and reducing resource collision.

DETAILED DESCRIPTION

The technical solutions in the embodiments of the present disclosure will be clearly and completely described below with reference to the accompanying drawings in the embodiments of the present disclosure. Obviously, the described embodiments are part, rather than all, of the embodiments of the present disclosure. All other embodiments obtained by a person of ordinary skill in the art based on the embodiments of the present disclosure without creative efforts shall fall within the protection scope of the present disclosure.

Terms "first," "second," and the like in the specification and claims of the present disclosure are used to distinguish similar objects, and are not used to describe a specific order or sequence. It should be understood that the terms used in this way can be interchanged under appropriate circumstances, so that the embodiments of the present disclosure can be implemented in an order other than those illustrated or described herein, and objects distinguished by "first", "second" and the like are generally a class and do not define the number of objects, such as the first object may be one or more objects. In addition, in the specification and in the claims, "and/or" means at least one of the connected objects, and the character "/" generally indicates that the associated objects have "or" relationship.

Figure 1:
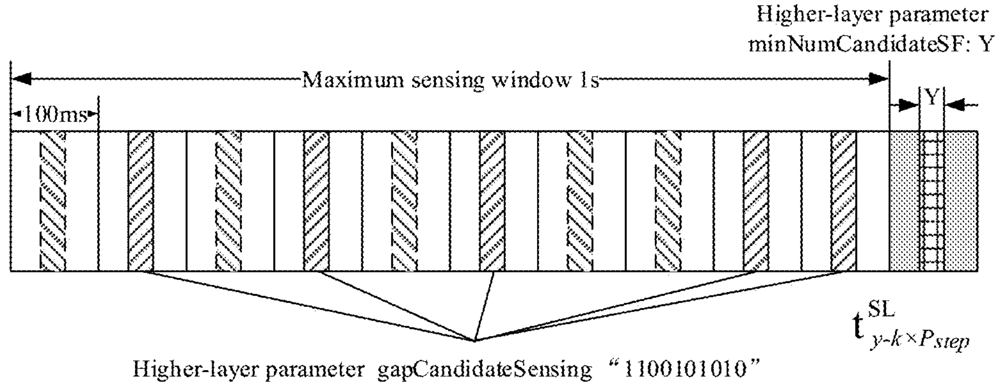
FIG. 1 is a schematic diagram of a resource selection window in a Long Term Evolution (LTE) sidelink.

For a better understanding of the solutions of the embodiments of the present disclosure, the following content is first introduced:

LTE-V2X Sidelink Resource Sensing: in an LTE sidelink, some sensing schemes are optimized only for a periodic service type, as shown in FIG. 1, wherein, UE monitors a group of Y candidate subframes determined at sensing occasions in a resource selection window according to $$t^{SL}_{y-k\times P_{step}};$$

a minimum denominator of $P_{step}$ is set to 100 ms, without considering a reservation period of 20/50 ms; periodic sensing occasions in the sensing window are determined by a k-th bit of a higher-layer parameter gapCandidateSensing.

NR-V2X Sidelink Resource Sensing: in an NR sidelink, there may be at most 16 configured or preconfigured possible resource reservation periods, including ([1: 99], 0, 100, 200, . . . , 1000), so as to satisfy a more universal service mode, in particular, a service mode with a short delay requirement. Therefore, a value of K will no longer be selected and determined based on locations of a set of periodic sensing occasions identified as integer multiples of 100 ms, to cover other allowed data packet reservation periods in a resource pool.

In the related art, in a distributed resource scheduling system of NR V2X Mode 2, for the case that two sensing operations of PBPS and CPS are performed at the same time, configuration of the resource selection window and configuration of a candidate resource set are not limited further. In a distributed resource scheduling system of LTE V2X Mode 2, only one resource selection window is configured for reservation of the Partial Sensing. Since a CPS sensing operation is considered in an NR V2X enhancement mechanism, if previous configuration of a resource selection window is used, a sufficient number of resources cannot be ensured.

The resource sensing method provided in the embodiments of the present disclosure is described in detail below with reference to the accompanying drawings and specific embodiments and application scenarios thereof.

The techniques described herein are not limited to fifth generation (5G) mobile communications systems, and subsequent evolved communications systems, and are not limited to LTE-Advanced (LTE-A) systems of LTE/LTE, and may also be used in various wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems.

The terms "system" and "network" are often used interchangeably. The CDMA system may implement radio technologies such as CDMA2000, Universal Terrestrial Radio Access (UTRA), etc. UTRA includes Wideband CDMA (Wideband Code Division Multiple Access, WCDMA), and other CDMA variants. A TDMA system may implement radio technologies such as Global System for Mobile Communication (GSM). An OFDMA system may implement radio technologies such as Ultra Mobile Broadband (UMB), Evolution UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE and more advanced LTE (e.g. LTE-A) are new UMTS versions using E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used in both systems and radio technologies mentioned above, as well as other systems and radio technologies.

Figure 2:
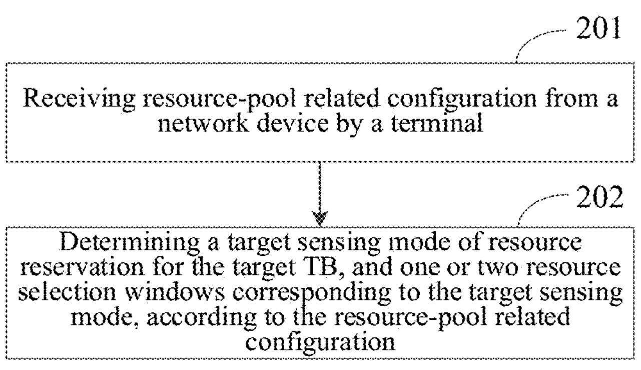
FIG. 2 is a schematic flowchart of a resource sensing method according to some embodiments of the present disclosure.

Referring to FIG. 2, some embodiments of the present disclosure provide a resource sensing method. The method includes:

Step 201: receiving resource-pool related configuration from a network device by a terminal;

Step 202: determining a target sensing mode of resource reservation for the target TB, and one or two resource selection windows corresponding to the target sensing mode, according to the resource-pool related configuration.

In the resource allocation mode of a sidelink mode 2 (Mode 2), the network side configures the resource pool for the terminal, and then the terminal determines a resource in the resource pool in a resource sensing manner. Specifically, the network device may send the resource-pool related configuration to the terminal.

In this embodiment of the present disclosure, when the terminal receives the resource-pool related configuration, a target sensing mode of resource reservation for the target TB and one or two resource selection windows corresponding to the target sensing mode are determined according to the configuration, so that when the terminal uses one sensing mode to perform resource reservation for the target TB, one resource selection window can be determined correspondingly, or when the terminal uses two sensing modes to perform resource reservation for the target TB, two resource selection windows can be determined correspondingly, the number of resource selection windows is flexibly configured for different scenes, enough candidate resources are ensured while the reservation resources are ensured, and resource collision is reduced.

Further, in a possible implementation, the method further includes:

determining, by the terminal, a candidate resource set in one or two resource selection windows through a target sensing mode, where the target TB includes: a TB of a periodic service and/or a TB of a non-periodic service, and the target sensing mode includes: PBPS and/or CPS.

In this embodiment of the present disclosure, after the terminal determines one or two resource selection windows based on different scenarios, the candidate resource set can also be determined in each resource selection window, so as to ensure that each sensing mode can have a corresponding candidate resource set, thereby facilitating resource reservation using two sensing modes.

In a possible implementation, the resource-pool related configuration includes:

(1) first information configured to indicate a first resource pool, wherein the terminal can learn, according to the first information, information of total resource pools configured by the network side;

(2) second information configured to indicate that the first resource pool is allowed for resource sensing performed by using the PBPS and/or the CPS, wherein the terminal may learn, according to the second information, which sensing mode can be used for resource sensing of the first resource pool;

(3) third information configured to indicate that the number of resource selection windows allowed to be configured for the first resource pool is one or two, wherein the terminal may learn, according to the third information, how many resource selection windows need to be configured.

In a possible implementation, receiving the resource-pool related configuration from the network device by the terminal specifically includes:

(1) receiving a PC5 RRC signaling from the network device by the terminal, where the PC5 RRC signaling carries the resource-pool related configuration; in this embodiment of the present disclosure, the network device sends the PC5 RRC signaling carrying the resource-pool related configuration (for example, the first information, the second information, and/or the third information) to the terminal, and in the specific implementation process, new signaling (such as one bit or multiple bits) may be added to the PC5 RRC signaling, and information such as the number of resource selection windows is indicated for the resource reservation of the target TB by means of the added signaling;

(2) a higher layer of the terminal sends higher layer signaling to a physical layer of the terminal, where the higher layer signaling carries the resource-pool related configuration; in this embodiment of the present disclosure, after the terminal obtains the resource-pool related configuration in the PC5 RRC signaling, the higher layer of the terminal sends the resource-pool related configuration to the physical layer of the terminal through the higher layer signaling.

In a possible implementation, determining the target sensing mode of the resource reservation for the target TB, and one or two resource selection windows corresponding to the target sensing mode, according to the resource-pool related configuration specifically includes any one of the following:

(1) in case that the target TB includes a TB of a periodic service, the terminal determines, according to the resource-pool related configuration, that a target sensing mode of resource reservation performed on the TB of the periodic service is the PBPS, and determines a first resource selection window corresponding to the PBPS; in this embodiment of the present disclosure, when resource reservation is performed for a TB of a certain periodic service, the UE may only use PBPS sensing for reservation, and configure a resource selection window for the sensing;

(2) In case that the target TB includes a TB of the non-periodic service, the terminal determines, according to the resource-pool related configuration, that a target sensing mode of resource reservation performed on the TB of the non-periodic service is CPS, and determines a first resource selection window corresponding to the CPS; in this embodiment of the present disclosure, when resource reservation is performed on a TB of a certain non-periodic service, the UE may only use CPS sensing for reservation, and configure a resource selection window for the sensing;

(3) in case that the target TB includes the TB of the periodic service, the terminal determines, according to the resource-pool related configuration, that the target sensing mode of resource reservation performed on the TB of the periodic service is PBPS and CPS, and determines a first resource selection window corresponding to the PBPS and the CPS; in this embodiment of the present disclosure, when resource reservation is performed on a TB of a certain periodic service, the UE may use both PBPS sensing and CPS sensing for reservation at the same time, and configure a resource selection window for the two sensing operations;

(4) in case that the target TB includes the TB of the non-periodic service, the terminal determines, according to the resource-pool related configuration, that the target sensing mode of resource reservation performed for the TB of the non-periodic service is PBPS and CPS, and determines a first resource selection window corresponding to the PBPS and the CPS; in this embodiment of the present disclosure, when resource reservation is performed on a TB of a certain non-periodic service, the UE may use both the PBPS and the CPS for reservation at the same time, and configure a resource selection window for the two sensing operations;

(5) in case that the target TB includes the TB of the periodic service and the TB of the non-periodic service, the terminal determines, according to the resource-pool related configuration, that the target sensing mode of resource reservation performed for the TB of the periodic service is PBPS, and the target sensing mode of resource reservation performed for the TB of the non-periodic service is CPS, and determines a first resource selection window corresponding to the PBPS and the CPS; in this embodiment of the present disclosure, when resource reservation is performed on a TB of a certain periodic service, the UE may use the PBPS for reservation and configures a resource selection window, and the UE may perform the CPS operation for resource reservation of the TB of another non-periodic service, and reserve resources in the configured resource selection window (i.e., the resource selection window configured for the PBPS);

(6) in case that the target TB includes the TB of the periodic service and the TB of the non-periodic service, the terminal determines, according to the resource-pool related configuration, that the target sensing mode of resource reservation performed for the TB of the periodic service is PBPS, and the target sensing mode of resource reservation performed for the TB of the non-periodic service is CPS, and determines a first resource selection window corresponding to the PBPS and a second resource selection window corresponding to the CPS; in the embodiments of the present disclosure, when resource reservation is performed for a TB of a certain periodic service, the UE uses the PBPS for reservation and configures a resource selection window, the UE may perform CPS operation for resource reservation of the TB of another non-periodic service, and configure another resource selection window, and the two sensing modes are respectively configured with two resource selection windows.

In a possible implementation, determining the candidate resource set in one resource selection window by the terminal specifically includes:

(1) sending a first parameter to a physical layer of the terminal by a higher layer of the terminal;

(2) determining a first resource set in a first resource selection window according to the first parameter by the physical layer of the terminal;

(3) performing resource sensing on the first resource set by means of the target sensing mode by the terminal and determining a first candidate resource set.

In this embodiment of the present disclosure, a first resource pool configured for the network side may include a large amount of resources, the terminal may determine an initial candidate resource set (denoted as Y) in the first resource selection window in advance, and the terminal senses the set Y through the PBPS or the CPS, and excludes candidate resources in the set Y based on the result of the sensing, so as to obtain the candidate resource set.

The minimum value of the number of subframes in the set Y is $Y_{min}$, and $Y_{min}$ is determined by a higher-layer parameter, that is, a first parameter. The first parameter is provided to the physical layer of the terminal by the higher layer of the terminal, and specifically, the first parameter is any value in the first parameter set pre-configured by the network device, for example, the network side pre-configures a set $[b_1, b_2, \ldots, b_L]$, which includes L parameters, the higher layer of the terminal selects one parameter from the L parameters as $Y_{min}$ and sends the $Y_{min}$ to the physical layer of the terminal. In this way, the size of the set Y can be determined according to $Y_{min}$.

In a possible implementation, determining a candidate resource set in two resource selection windows by the terminal specifically includes:

(1) a higher layer of a terminal sends a first parameter and a second parameter to a physical layer of a terminal;

(2) the physical layer of the terminal determines a first resource set in the first resource selection window according to the first parameter, and determines a second resource set in the second resource selection window according to the second parameter;

(3) the terminal performs resource sensing on the first resource set by means of the target sensing mode, determines a first candidate resource set, and performs resource sensing on the second resource set to determine a second candidate resource set.

The first parameter is the minimum value of the number of subframes in the first resource set, the second parameter is the minimum value of the number of subframes in the second resource set, the first parameter is any one of the first parameter set, the second parameter is any one of the second parameter set, and the first parameter set and the second parameter set are two sets pre-configured by the network device.

In this embodiment of the present disclosure, a first resource pool configured for the network side may include a large amount of resources, the terminal may determine an initial candidate resource set (denoted as $Y_1$) in the first resource selection window in advance, and determine an initial candidate resource set (denoted as $Y_2$) in the second resource selection window in advance, and the terminal senses the set $Y_1$ and the set $Y_2$ through the PBPS and the CPS, and excludes candidate resources in the set $Y_1$ and the set $Y_2$ based on the result of the sensing, so as to obtain two candidate resource sets.

The minimum value of the number of subframes in the candidate resource set $Y_1$ and the minimum value of the number of subframes in the candidate resource set $Y_2$ are different. The minimum value of the number of subframes in the set $Y_1$ is $Y_{min1}$, and the minimum value of the number of subframes in the set $Y_2$ is $Y_{min2}$, $Y_{min1}$ and $Y_{min2}$ are determined by higher-layer parameters, that is, a first parameter and a second parameter. The first parameter and the second parameter are provided to the physical layer of the terminal by the higher layer of the terminal, and specifically, the first parameter is any value in the first parameter set pre-configured by the network device, for example, the network side pre-configures a set $[a_1, a_2, \ldots, a_L]$, which includes L parameters, the higher layer of the terminal selects one parameter from the L parameters as $Y_{min1}$ and sends the $Y_{min1}$ to the physical layer of the terminal, in this way, the size of the set $Y_1$ can be determined according to $Y_{min1}$. Similarly, the second parameter is any value in the second parameter set pre-configured by the network device, for example, the network side pre-configures a set $[a_1, a_2, \ldots, a_L]$ which may be same as the first parameter set, the higher layer of the terminal selects one parameter from the L parameters as $Y_{min2}$ and sends the $Y_{min2}$ to the physical layer of the terminal, in this way, the size of the set $Y_2$ can be determined according to $Y_{min2}$.

Optionally, determining the candidate resource sets in the two resource selection windows by the terminal includes:

(1) a higher layer of a terminal sends a third parameter to a physical layer of a terminal;

2) the physical layer of the terminal determines the first resource set in the first resource selection window and the second resource set in the second resource selection window according to the third parameter;

(3) the terminal performs resource sensing on the first resource set and determines a first candidate resource set, and performs resource sensing on the second resource set and determines a second candidate resource set, by means of the target sensing mode.

The third parameter is any one of a third parameter set, and the third parameter set is a set preconfigured by the network device.

In this embodiment of the present disclosure, the minimum value of the number of subframes in the candidate resource set $Y_1$ and the minimum value of the number of subframes in the candidate resource set $Y_2$ are same. Both minimum values of the numbers of subframes in the sets $Y_1$ and $Y_2$ are $Y_{min}$, and $Y_{min}$ is determined by a higher-layer parameter, that is, the third parameter. The third parameter is provided to the physical layer of the terminal by the higher layer of the terminal, and specifically, the third parameter is any value in the third parameter set pre-configured by the network device, for example, the network side pre-configures a set $[a_1, a_2, \ldots a_L]$, which includes L parameters, the higher layer of the terminal selects one parameter from the L parameters as $Y_{min}$ and sends the $Y_{min}$ to the physical layer of the terminal, in this way, the sizes of the sets $Y_1$ and $Y_2$ can be determined according to $Y_{min}$.

It should be noted that the specific positions and sizes of the $Y_1$ and $Y_2$ are determined by implementation of the terminal, and the specific process of the determining is not limited in the embodiments of the present disclosure.

In some possible implementations, in a scenario in which only one first candidate resource set exists and two sensing modes are used, the configured first parameter set $[b_1, b_2, \ldots, b_L]$, where $b_1=2a_1$, $b_2=2a_2$, . . . , $b_L=2a_L$, that is, a size of a parameter in the corresponding parameter set in case that only one candidate resource set exists may be set to be twice of the size of the parameter in a scenario where there are two candidate resource sets. Correspondingly, in a scenario in which only one first candidate resource set exists and one sensing mode is used, $b_1=a_1$, $b_2=a_2$, . . . , $b_L=a_L$.

Further, the method further includes: determining the order of the first resource selection window and the second resource selection window by the terminal, and/or determining the size of the first resource selection window and the size of the second resource selection window by the terminal.

In this embodiment of the present disclosure, the order and/or sizes of the two resource selection windows corresponding to the PBPS and CPS sensing modes are determined by implementation of the terminal, and the specific process of the determination is not limited in the embodiments of the present disclosure.

The solutions of the present disclosure are described below with reference to specific embodiments.

Embodiment 1: resource allocation of reserving a resource for a periodic TB by means of PBPS and CPS.

Figure 3A:
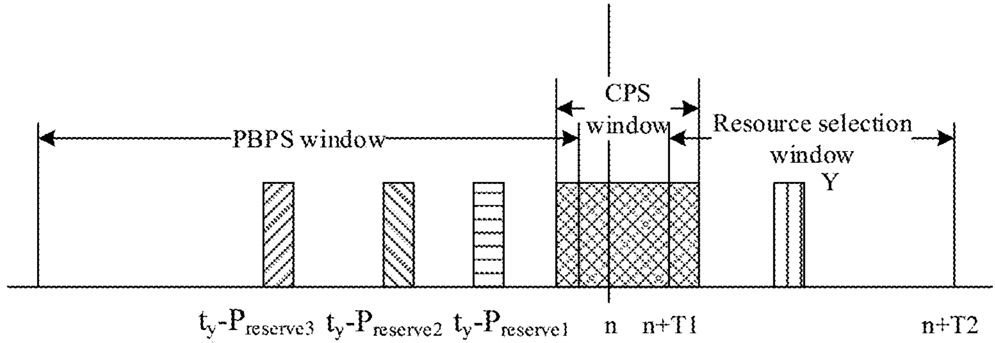
FIG. 3A is a first schematic diagram of an application scenario according to some embodiments of the present disclosure.

Referring to FIG. 3*a*, when the UE reserves a resource for a TB transmitted periodically, the following steps are performed to determine the reserved resource.

Step 1: a network side notifies resource-pool related configuration to a terminal, the configuration includes:

(1) information of a resource pool;

(2) the resource pool supports resource sensing by means of PBPS and CPS;

(3) the number of configured resource selection windows allowed by the resource pool is 1 or 2.

Step 2: the terminal performs resource reservation after receiving the resource-pool related configuration, as shown in FIG. 3*a*, wherein, (1) the UE determines a candidate resource Y in a resource selection window for an upcoming periodically transmitted TB;

(2) a resource selection window $[n+T_1, n+T_2]$ is configured for the non-periodically transmitted TB;

(3) Y is not less than the configured $Y_{min}$ ($Y_{min}$ is determined by a higher layer parameter, and is a value selected from $[2a_1, 2a_2, \ldots, 2a_L]$;

(4) the UE performs resource sensing for the non-periodically transmitted TB by means of the two sensing modes PBPS and CPS.

Step 3: the UE performs resource exclusion according to the result of the sensing, and reports the finally determined candidate resource set to the higher layer.

Embodiment 2: resource allocation of reserving a resource for a non-periodic TB by means of PBPS and CPS.

This scenario may be similar to that in FIG. 3*a*, when the UE reserves a resource for a TB transmitted non-periodically, the following steps are performed to determine the reserved resource.

Step 1: a network side notifies resource-pool related configuration to a terminal, the configuration includes:

(1) information of a resource pool;

(2) the resource pool supports resource sensing by means of PBPS and CPS;

(3) the number of configured resource selection windows allowed by the resource pool is 1 or 2.

Step 2: the terminal performs resource reservation after receiving the resource-pool related configuration, as shown in FIG. 3*a*, wherein, (1) the UE determines a candidate resource Y in a resource selection window for an upcoming non-periodically transmitted TB;

(2) a resource selection window [n+T1, n+T2] is configured for the periodically transmitted TB;

(3) Y is not less than the configured $Y_{min}$ ($Y_{min}$ is determined by a higher layer parameter, and is a value selected from $[2a_1, 2a_2, \ldots, 2a_L]$;

(4) the UE performs resource sensing for the periodically transmitted TB by means of the two sensing modes PBPS and CPS.

Step 3: the UE performs resource exclusion according to the result of the sensing, and reports the finally determined candidate resource set to the higher layer.

Embodiment 3: resource allocation of reserving resources for a periodic TB and a non-periodic TB by means of PBPS and CPS.

Figure 3B:
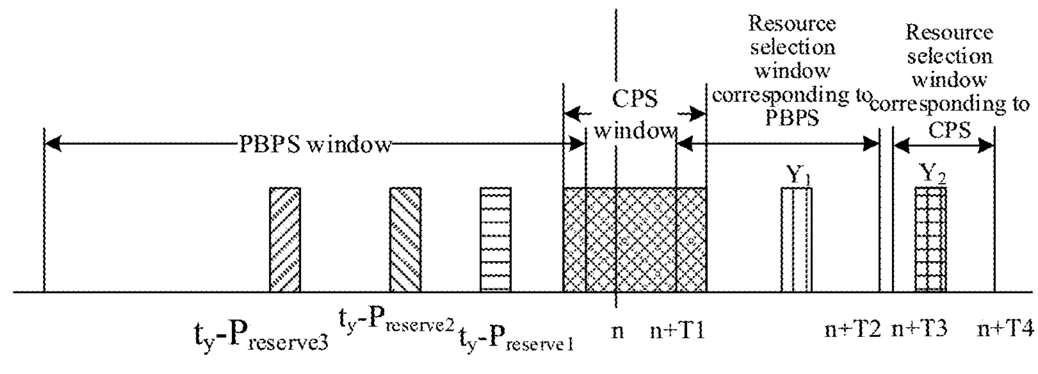
FIG. 3B is a second schematic diagram of an application scenario according to some embodiments of the present disclosure.

Referring to FIG. 3*b*, when the UE reserves a resource for a TB transmitted periodically, the following steps are performed to determine the reserved resource.

Step 1: a network side notifies resource-pool related configuration to a terminal, the configuration includes:

(1) information of a resource pool;

(2) the resource pool supports resource sensing by means of PBPS and CPS;

(3) the number of configured resource selection windows allowed by the resource pool is 1 or 2.

Step 2: the terminal performs resource reservation for the periodically transmitted TB after receiving the resource-pool related configuration, as shown in FIG. 3*b*, wherein, (1) the UE determines a candidate resource $Y_1$ in a resource selection window for an upcoming periodically transmitted TB;

(2) a resource selection window $[n+T_1, n+T_2]$ is configured for the periodically transmitted TB;

(3) $Y_1$ is not less than the configured $Y_{min}$ ($Y_{min}$ is determined by a higher layer parameter, and is a value selected from $[a_1, a_2, \ldots, a_L)$;

(4) the UE performs resource sensing for the periodically transmitted TB by means of PBPS.

Step 3: the UE performs resource reservation for the other non-periodically transmitted TB, as shown in FIG. 3*b*, wherein, (1) the UE determines a candidate resource $Y_2$ in a resource selection window for the other non-periodically transmitted TB;

(2) a resource selection window $[n+T_3, n+T_4]$ is configured for the non-periodically transmitted TB;

(3) $Y_2$ is not less than the configured $Y_{min}$ ($Y_{min}$ is determined by a higher layer parameter, and is a value selected from $[a_1, a_2, \ldots, a_L]$;

(4) the UE performs resource sensing for the non-periodically transmitted TB by means of CPS.

Step 4: the UE performs resource exclusion according to the result of the sensing, and reports the finally determined candidate resource set to the higher layer.

Figure 4:
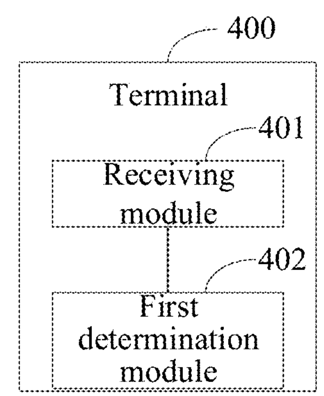
FIG. 4 is a schematic structural diagram of a terminal according to some embodiments of the present disclosure.

Referring to FIG. 4, some embodiments of the present disclosure provides a terminal 400. The terminal 400 includes:

a receiving module 401, configured to receive resource-pool related configuration from a network device by the terminal;

a first determination module 402, configured to determine a target sensing mode of resource reservation for the target TB by the terminal, and one or two resource selection windows corresponding to the target sensing mode, according to the resource-pool related configuration.

In a possible implementation, the terminal further includes:

a second determination module, configured to determine, by the terminal, a candidate resource set in the one or two resource selection windows through the target sensing mode, where the target TB includes: a TB of a periodic service and/or a TB of a non-periodic service, and the target sensing mode includes: PBPS and/or CP.

In a possible implementation, the resource-pool related configuration includes: first information configured to indicate a first resource pool;

second information configured to indicate that the first resource pool is allowed for resource sensing performed by using the PBPS and/or the CPS; third information configured to indicate that the number of resource selection windows allowed to be configured for the first resource pool is one or two.

In a possible implementation, the first determination module is further configured to:

in case that the target TB includes a TB of a periodic service, determine, according to the resource-pool related configuration, that a target sensing mode of resource reservation performed on the TB of the periodic service is the PBPS, and determine a first resource selection window corresponding to the PBPS;

in case that the target TB includes a TB of the non-periodic service, determine, according to the resource-pool related configuration, that a target sensing mode of resource reservation performed on the TB of the non-periodic service is CPS, and determine a first resource selection window corresponding to the CPS;

in case that the target TB includes the TB of the periodic service, determine, according to the resource-pool related configuration, that the target sensing mode of resource reservation performed on the TB of the periodic service is PBPS and CPS, and determine a first resource selection window corresponding to the PBPS and the CPS;

in case that the target TB includes the TB of the non-periodic service, determine, according to the resource-pool related configuration, that the target sensing mode of resource reservation performed for the TB of the non-periodic service is PBPS and CPS, and determine a first resource selection window corresponding to the PBPS and the CPS;

in case that the target TB includes the TB of the periodic service and the TB of the non-periodic service, determine, according to the resource-pool related configuration, that the target sensing mode of resource reservation performed for the TB of the periodic service is PBPS, and the target sensing mode of resource reservation performed for the TB of the non-periodic service is CPS, and determine a first resource selection window corresponding to the PBPS and the CPS;

in case that the target TB includes the TB of the periodic service and the TB of the non-periodic service, determine, according to the resource-pool related configuration, that the target sensing mode of resource reservation performed for the TB of the periodic service is PBPS, and the target sensing mode of resource reservation performed for the TB of the non-periodic service is CPS, and determine a first resource selection window corresponding to the PBPS and a second resource selection window corresponding to the CPS.

In a possible implementation, the second determination module is further configured to:

send a first parameter to a physical layer of the terminal by a higher layer of the terminal;

determine a first resource set in a first resource selection window according to the first parameter by the physical layer of the terminal;

perform resource sensing on the first resource set by means of the target sensing mode by the terminal and determine a first candidate resource set.

The first parameter is the minimum value of the number of subframes in the first resource set, the first parameter is any one of the first parameter set, and the first parameter set is pre-configured by the network device.

In a possible implementation, the second determination module is further configured to:

send a first parameter and a second parameter to a physical layer of the terminal by the higher layer of the terminal;

determine, by the physical layer of the terminal, a first resource set in the first resource selection window according to the first parameter, and determine a second resource set in the second resource selection window according to the second parameter;

perform resource sensing on the first resource set by means of the target sensing mode by the terminal to determine a first candidate resource set, and perform resource sensing on the second resource set to determine a second candidate resource set.

The first parameter is the minimum value of the number of subframes in the first resource set, the second parameter is the minimum value of the number of subframes in the second resource set, the first parameter is any one of the first parameter set, the second parameter is any one of the second parameter set, and the first parameter set and the second parameter set are two sets pre-configured by the network device.

In a possible implementation, the second determination module is further configured to:

send a third parameter to the physical layer of the terminal by the higher layer of the terminal;

determine a first resource set in the first resource selection window and a second resource set in the second resource selection window according to the third parameter by the physical layer of the terminal;

perform resource sensing on the first resource set to determine a first candidate resource set, and perform resource sensing on the second resource set to determine a second candidate resource set, by means of the target sensing mode, by the terminal.

The third parameter is any one of a third parameter set, and the third parameter set is a set preconfigured by the network device.

In a possible implementation, the terminal further includes:

a third determining module, configured to determine the order of the first resource selection window and the second resource selection window by the terminal, and/or determine the size of the first resource selection window and the size of the second resource selection window by the terminal.

In a possible implementation, the receiving module is further configured to: receive a PC5 RRC signaling from the network device by the terminal, where the PC5 RRC signaling carries the resource-pool related configuration;

send higher layer signaling to a physical layer of the terminal by the higher layer of the terminal, where the higher layer signaling carries the resource-pool related configuration.

Figure 5:
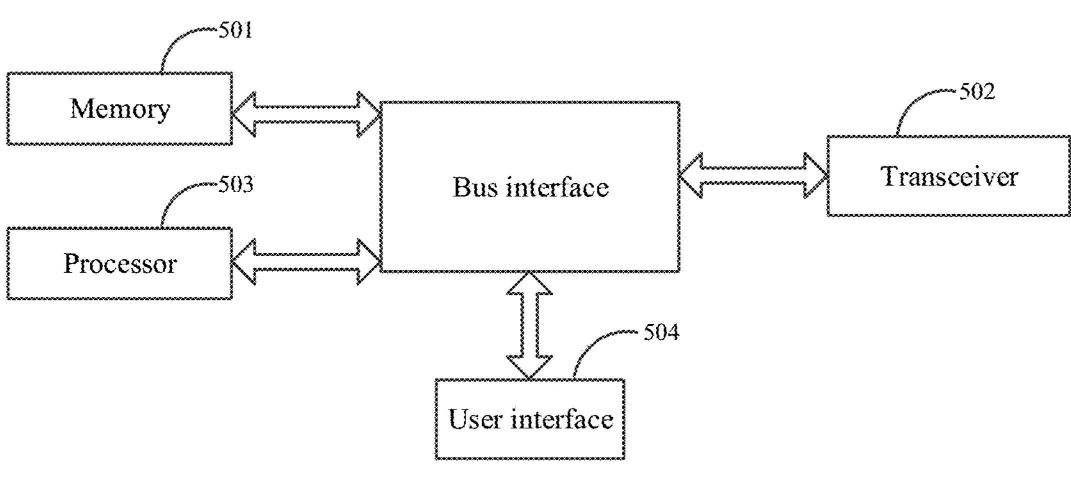
FIG. 5 is a second schematic structural diagram of a terminal according to some embodiments of the present disclosure.

Referring to FIG. 5, some embodiments of the present disclosure provide a terminal, including a memory 501, a transceiver 502, a processor 503, and a user interface 504.

The transceiver 502 is configured to receive and send data under the control of the processor 503.

In FIG. 5, a bus architecture may include any number of interconnected buses and bridges. Specifically, various circuits such as one or more processors represented by the processor 503 and a memory represented by the memory 501 are linked together. The bus architecture may also link together various other circuits, such as peripheral devices, voltage regulators, and power management circuits, etc. which are well known in the art, and therefore are not further described herein. The bus interface provides an interface. The transceiver 502 may be a plurality of elements, i.e. include a transmitter and a receiver, and provide units for communicating with various other devices on a transmission medium. The transmission medium includes a wireless channel, a wired channel, and an optical cable. For different user equipment, the user interface 504 may also be an interface that can be externally or internally connected to a required device, and the connected device includes, but is not limited to, a keypad, a display, a speaker, a microphone, a joystick, etc.

The processor 503 is responsible for managing the bus architecture and general processing, and the memory 501 may store data used by the processor 503 when performing an operation.

Optionally, the processor 503 may be a CPU (a central processing unit), an ASIC (Application Specific Integrated Circuit), an FPGA (Field-Programmable Gate Array) or a CPLD (Complex Programmable Logic Device), and the processor may also adopt a multi-core architecture.

The processor 503 is configured to read the computer program in the memory 501 and execute the resource sensing method as shown in FIG. 2 to FIG. 3*b*, the method includes the following:

receiving resource-pool related configuration from a network device by the terminal;

determining a target sensing mode of resource reservation for the target TB by the terminal, and one or two resource selection windows corresponding to the target sensing mode, according to the resource-pool related configuration.

Optionally, the target TB includes: a TB of a periodic service and/or a TB of a non-periodic service, and the target sensing mode includes: Period-based Partial Sensing (PBPS) and Contiguous Partial Sensing (CPS).

The processor 503 is configured to read the computer program in the memory 501 and further execute following:

determining, by the terminal, a candidate resource set in the one or two resource selection windows.

Optionally, the resource-pool related configuration includes:

first information configured to indicate a first resource pool;

second information configured to indicate that the first resource pool is allowed for resource sensing performed by using the PBPS and/or the CPS;

third information configured to indicate that the number of resource selection windows allowed to be configured for the first resource pool is one or two.

Optionally, the processor 503 is configured to read the computer program in the memory 501 and further execute following:

in case that the target TB includes a TB of a periodic service, determining, according to the resource-pool related configuration, that a target sensing mode of resource reservation performed on the TB of the periodic service is the PBPS, and determining a first resource selection window corresponding to the PBPS;

in case that the target TB includes a TB of the non-periodic service, determining, according to the resource-pool related configuration, that a target sensing mode of resource reservation performed on the TB of the non-periodic service is CPS, and determining a first resource selection window corresponding to the CPS;

in case that the target TB includes the TB of the periodic service, determining, according to the resource-pool related configuration, that the target sensing mode of resource reservation performed on the TB of the periodic service is PBPS and CPS, and determining a first resource selection window corresponding to the PBPS and the CPS;

in case that the target TB includes the TB of the non-periodic service, determining, according to the resource-pool related configuration, that the target sensing mode of resource reservation performed for the TB of the non-periodic service is PBPS and CPS, and determining a first resource selection window corresponding to the PBPS and the CPS;

in case that the target TB includes the TB of the periodic service and the TB of the non-periodic service, determining, according to the resource-pool related configuration, that the target sensing mode of resource reservation performed for the TB of the periodic service is PBPS, and the target sensing mode of resource reservation performed for the TB of the non-periodic service is CPS, and determining a first resource selection window corresponding to the PBPS and the CPS;

in case that the target TB includes the TB of the periodic service and the TB of the non-periodic service, determining, according to the resource-pool related configuration, that the target sensing mode of resource reservation performed for the TB of the periodic service is PBPS, and the target sensing mode of resource reservation performed for the TB of the non-periodic service is CPS, and determining a first resource selection window corresponding to the PBPS and a second resource selection window corresponding to the CPS.

Optionally, the processor 503 is configured to read the computer program in the memory 501 and further execute following:

sending a first parameter to a physical layer of the terminal by a higher layer of the terminal;

determining a first resource set in a first resource selection window according to the first parameter by the physical layer of the terminal;

performing resource sensing on the first resource set by means of the target sensing mode by the terminal and determining a first candidate resource set.

The first parameter is the minimum value of the numbers of subframes in the first resource set, the first parameter is any one of the first parameter set, and the first parameter set is pre-configured by the network device.

Optionally, the processor 503 is configured to read the computer program in the memory 501 and further execute following:

sending a first parameter and a second parameter to a physical layer of the terminal by the higher layer of the terminal;

determining, by the physical layer of the terminal, a first resource set in the first resource selection window according to the first parameter, and determining a second resource set in the second resource selection window according to the second parameter;

performing resource sensing on the first resource set by means of the target sensing mode by the terminal to determine a first candidate resource set, and performing resource sensing on the second resource set to determine a second candidate resource set.

The first parameter is the minimum value of the numbers of subframes in the first resource set, the second parameter is the minimum value of the numbers of subframes in the second resource set, the first parameter is any one of the first parameter set, the second parameter is any one of the second parameter set, and the first parameter set and the second parameter set are two sets pre-configured by the network device.

Optionally, the processor 503 is configured to read the computer program in the memory 501 and further execute following:

sending a third parameter to the physical layer of the terminal by the higher layer of the terminal;

determining a first resource set in the first resource selection window and a second resource set in the second resource selection window according to the third parameter by the physical layer of the terminal;

performing resource sensing on the first resource set to determine a first candidate resource set, and performing resource sensing on the second resource set to determine a second candidate resource set, by means of the target sensing mode, by the terminal.

The third parameter is any one of a third parameter set, and the third parameter set is a set preconfigured by the network device.

Optionally, the processor 503 is configured to read the computer program in the memory 501 and further execute following:

determining the order of the first resource selection window and the second resource selection window by the terminal, and/or determining the size of the first resource selection window and the size of the second resource selection window by the terminal.

Optionally, the processor 503 is configured to read the computer program in the memory 501 and further execute following:

receiving a PC5 RRC signaling from the network device by the terminal, where the PC5 RRC signaling carries the resource-pool related configuration;

sending higher layer signaling to a physical layer of the terminal by the higher layer of the terminal, where the higher layer signaling carries the resource-pool related configuration.

Embodiments of the present disclosure further provide a computer-readable storage medium, wherein the computer-readable storage medium stores a computer program or instruction, and when the computer program or instruction is executed by the processor, each process of the above-mentioned resource sensing method is implemented, and the same technical effect can be achieved, details are not described herein again to avoid repetition.

The processor is a processor in the electronic device described in the above embodiments. The readable storage medium includes a computer readable storage medium, such as a computer read-only memory (ROM), a random access memory (RAM), a magnetic disk, or an optical disc.

It should be noted that, in this context of the present disclosure, terms "include", "comprising", or any other variant thereof are intended to cover a non-exclusive inclusion, such that a process, a method, an article, or an apparatus that includes a series of elements includes not only those elements, but also other elements not explicitly listed, or elements inherent to such a process, method, article, or apparatus. In the absence of more restrictions, the statement "includes a" defining an element does not exclude the presence of another same element in the process, method, article, or apparatus that includes the element. Moreover, it should be noted that the scope of the methods and apparatuses in the embodiments of the present disclosure are not limited to define the functions in the order shown or discussed, and may further include performing the functions in a substantially simultaneous manner or in an opposite order according to the involved functions, for example, the described methods may be performed in a different order than that described, and various steps may also be added, omitted, or combined. In addition, features described with reference to certain examples may be combined in other examples.

Through the description of the above embodiments, a person skilled in the art may clearly understand that the method described above may be implemented by means of software plus a necessary general hardware platform, and certainly may also be implemented by hardware, but in many cases, the former is a better implementation. Based on such understanding, the essential part, or the part contributing to the related art, of the technical solution of the present disclosure may be embodied in the form of a software product, which is stored in a storage medium (such as a ROM/RAM, a magnetic disk, and an optical disc), and includes several instructions for enabling a terminal (which may be a mobile phone, a computer, a server, an air conditioner, or a network device, etc.) to perform the method according to various embodiments of the present disclosure.

The embodiments of the present disclosure are described above with reference to the accompanying drawings, but the present disclosure is not limited to the specific embodiments described above, and the specific embodiments described above are merely illustrative rather than limiting, and a person of ordinary skill in the art can also make many forms without departing from the spirit of the present disclosure and the scope of protection of the claims, which are all within the protection of the present disclosure.

It should be noted that, the division of the above modules is merely a division of a logical function, and all or some of the modules may be integrated onto one physical entity during actual implementation, or may be physically separated. In addition, these modules may all be implemented in the form of software invoked by a processing element, or may all be implemented in the form of hardware; or some modules may be implemented in the form of a processing element invoking software, and some of the modules are implemented in the form of hardware. For example, the determining module may be a separately set processing element, or may be integrated in a certain chip of the foregoing apparatus, and in addition, the determining module may also be stored in a memory of the apparatus in the form of program code, and a certain processing element of the apparatus invokes and executes the functions of the determining module. Implementations of other modules are similar. In addition, all or part of these modules may be integrated together, or may be implemented independently. The processing element described herein may be an integrated circuit having a signal processing capability. In an implementation process, each step of the above-mentioned method or each of the above modules may be completed by means of an integrated logic circuit of hardware in the processor element or an instruction in a software form.

For example, each module, unit, subunit, or sub-module may be one or more integrated circuits configured to implement the above method, for example, one or more application specific integrated circuits (ASICs), or one or more microprocessors (digital signal processors, DSPs), or one or more field programmable gate arrays (FPGAs), etc. For another example, when a certain module is implemented in the form of a processing element scheduling program codes, the processing element may be a general-purpose processor, for example, a central processing unit (CPU) or another processor that may invoke a program code. For another example, these modules may be integrated together and implemented in the form of a system-on-a-chip (SOC).

The terms "first," "second," and the like in the specification and claims of the present disclosure are used to distinguish similar objects, and do not need to be used to describe a specific order or sequence. It should be understood that the terms used in this way may be interchanged under appropriate circumstances so that the embodiments of the disclosure described herein, for example, are implemented in an order other than those illustrated or described herein. Furthermore, the terms "include" and "have" and any variations thereof are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices. In addition, the description and the claims use "and/or" indicate at least one of the connected objects, such as A and/or B and/or C, indicating that there are seven cases including A exists alone, B exists alone, C exists alone, and both A and B exist, both B and C exist, both A and C exist, and all of A, B and C exist. Similarly, the use of "at least one of A and B" in this specification and in the claims should be understood as "A exists alone, B exists alone, or both A and B exist".

The embodiments of the present disclosure are described above with reference to the accompanying drawings, but the present disclosure is not limited to the specific embodiments described above, and the specific embodiments described above are merely illustrative rather than limiting, and a person of ordinary skill in the art can also make many forms without departing from the spirit of the present disclosure and the scope of protection of the claims, which are all within the protection scope of the present disclosure.

What is claimed is:

1. A resource sensing method, comprising:

receiving resource-pool related configuration from a network device by a terminal;

determining, by the terminal according to the resource-pool related configuration, one or more target sensing modes of resource reservation for one or more target Transport Blocks (TBs), and one or two resource selection windows corresponding to the one or more target sensing modes, wherein the resource-pool related configuration comprises:

first information configured to indicate a first resource pool;

second information configured to indicate that the first resource pool is allowed for resource sensing performed by using Period-based Partial Sensing (PBPS) and/or Contiguous Partial Sensing (CPS);

third information configured to indicate that a quantity of resource selection windows allowed to be configured for the first resource pool is one or two.

2. The method according to claim 1, wherein the one or more target TBs comprise a TB of a periodic service and/or a TB of a non-periodic service, and the one or more target sensing modes comprise Period-based Partial Sensing (PBPS) and Contiguous Partial Sensing (CPS); and the method further comprises:

determining, by the terminal, a candidate resource set in the one or two resource selection windows.

3. The method according to claim 1, wherein determining, by the terminal according to the resource-pool related configuration, the one or more target sensing modes of resource reservation for the one or more target TBs and the one or two resource selection windows corresponding to the one or more target sensing modes comprises any one of following:

in case that the one or more target TBs comprise the TB of the periodic service, determining, by the terminal according to the resource-pool related configuration, that one or more target sensing modes of resource reservation performed on the TB of the periodic service are the PBPS, and determining a first resource selection window corresponding to the PBPS;

in case that the one or more target TBs comprise the TB of the non-periodic service, determining, by the terminal according to the resource-pool related configuration, that one or more target sensing modes of resource reservation performed on the TB of the non-periodic service are the CPS, and determining a first resource selection window corresponding to the CPS;

in case that the one or more target TBs comprise the TB of the periodic service, determining, by the terminal according to the resource-pool related configuration, that one or more target sensing modes of resource reservation performed on the TB of the periodic service are the PBPS and the CPS, and determining a first resource selection window corresponding to the PBPS and the CPS;

in case that the one or more target TBs comprise the TB of the non-periodic service, determining, by the terminal according to the resource-pool related configuration, that the one or more target sensing modes of resource reservation performed for the TB of the non-periodic service are the PBPS and the CPS, and determining a first resource selection window corresponding to the PBPS and the CPS;

in case that the one or more target TBs comprise the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and the CPS;

in case that the one or more target TBs comprise the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and a second resource selection window corresponding to the CPS.

4. The method according to claim 3, wherein determining, by the terminal, the candidate resource set in one resource selection window comprises:

sending a first parameter to a physical layer of the terminal by a higher layer of the terminal;

determining a first resource set in a first resource selection window according to the first parameter by the physical layer of the terminal;

performing resource sensing on the first resource set by means of the one or more target sensing modes by the terminal and determining a first candidate resource set, wherein the first parameter is a minimum value of amounts of subframes in the first resource set, the first parameter is any one parameter of the first parameter set, and the first parameter set is pre-configured by the network device.

5. The method according to claim 3, wherein determining, by the terminal, the candidate resource set in two resource selection windows comprises:

sending a first parameter and a second parameter to a physical layer of the terminal by a higher layer of the terminal;

determining, by the physical layer of the terminal, a first resource set in a first resource selection window according to the first parameter, and determining a second resource set in a second resource selection window according to the second parameter;

performing resource sensing on the first resource set to determine a first candidate resource set, and performing resource sensing on the second resource set to determine a second candidate resource set, by means of the one or more target sensing modes by the terminal, wherein the first parameter is a minimum value of amounts of subframes in the first resource set, the second parameter is a minimum value of amounts of subframes in the second resource set, the first parameter is any one parameter of the first parameter set, the second parameter is any one parameter of the second parameter set, and the first parameter set and the second parameter set are two sets pre-configured by the network device.

6. The method according to claim 3, wherein determining, by the terminal, the candidate resource set in two resource selection windows comprises:

sending a third parameter to a physical layer of the terminal by a higher layer of the terminal;

determining a first resource set in a first resource selection window and a second resource set in a second resource selection window according to the third parameter by the physical layer of the terminal;

performing resource sensing on the first resource set to determine a first candidate resource set, and performing resource sensing on the second resource set to determine a second candidate resource set, by means of the one or more target sensing modes by the terminal, wherein the third parameter is any one parameter of a third parameter set, and the third parameter set is a set preconfigured by the network device.

7. The method according to claim 3, wherein the method further comprises:

determining an order of the first resource selection window and an order of the second resource selection window by the terminal, and/or determining a size of the first resource selection window and a size of the second resource selection window by the terminal.

8. The method according to claim 1, wherein receiving the resource-pool related configuration from the network device by the terminal comprises:

receiving a Proximity Communication 5 Radio Resource Control (PC5 RRC) signaling from the network device by the terminal, wherein the PC5 RRC signaling carries the resource-pool related configuration;

sending higher layer signaling to a physical layer of the terminal by a higher layer of the terminal, wherein the higher layer signaling carries the resource-pool related configuration.

9. A non-transitory computer-readable storage medium, wherein the computer-readable storage medium stores a computer program, the computer program is configured to cause a computer to execute the resource sensing method according to claim 1.

10. A terminal, comprising:

a memory, a transceiver, a processor, wherein the memory is configured to store a computer program, the transceiver is configured to send and receive data under control of the processor, and the processor is configured to read the computer program in the memory and execute following:

receiving resource-pool related configuration from a network device by the terminal;

determining, by the terminal according to the resource-pool related configuration, one or more target sensing modes of resource reservation for one or more target Transport Blocks (TBs), and one or two resource selection windows corresponding to the one or more target sensing modes, wherein the resource-pool related configuration comprises:

first information configured to indicate a first resource pool;

second information configured to indicate that the first resource pool is allowed for resource sensing performed by using Period-based Partial Sensing (PBPS) and/or Contiguous Partial Sensing (CPS);

third information configured to indicate that a quantity of resource selection windows allowed to be configured for the first resource pool is one or two.

11. The terminal according to claim 10, wherein the one or more target TBs comprise a TB of a periodic service and/or a TB of a non-periodic service, and the one or more target sensing modes comprise Period-based Partial Sensing (PBPS) and Contiguous Partial Sensing (CPS); and the processor is configured to read the computer program in the memory and execute further following:

determining, by the terminal, a candidate resource set in the one or two resource selection windows.

12. The terminal according to claim 10, wherein the processor is configured to read the computer program in the memory and execute further following:

in case that the one or more target TBs comprise the TB of the periodic service, determining, by the terminal according to the resource-pool related configuration, that one or more target sensing modes of resource reservation performed on the TB of the periodic service are the PBPS, and determining a first resource selection window corresponding to the PBPS;

in case that the one or more target TBs comprise the TB of the non-periodic service, determining, by the terminal according to the resource-pool related configuration, that one or more target sensing modes of resource reservation performed on the TB of the non-periodic service are the CPS, and determining a first resource selection window corresponding to the CPS;

in case that the one or more target TBs comprise the TB of the periodic service, determining, by the terminal according to the resource-pool related configuration, that one or more target sensing modes of resource reservation performed on the TB of the periodic service are the PBPS and the CPS, and determining a first resource selection window corresponding to the PBPS and the CPS;

in case that the one or more target TBs comprise the TB of the non-periodic service, determining, by the terminal according to the resource-pool related configuration, that the one or more target sensing modes of resource reservation performed for the TB of the non-periodic service are the PBPS and the CPS, and determining a first resource selection window corresponding to the PBPS and the CPS;

in case that the one or more target TBs comprise the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and the CPS;

in case that the one or more target TBs comprise the TB of the periodic service and the TB of the non-periodic service, determining, by the terminal according to the resource-pool related configuration, that one or more target sensing modes of resource reservation performed for the TB of the periodic service are the PBPS, and one or more target sensing modes of resource reservation performed for the TB of the non-periodic service are the CPS, and determining a first resource selection window corresponding to the PBPS and a second resource selection window corresponding to the CPS.

13. The terminal according to claim 12, wherein the processor is configured to read the computer program in the memory and execute further following:

sending a first parameter to a physical layer of the terminal by a higher layer of the terminal;

determining a first resource set in a first resource selection window according to the first parameter by the physical layer of the terminal;

performing resource sensing on the first resource set by means of the one or more target sensing modes by the terminal and determining a first candidate resource set, wherein the first parameter is a minimum value of amounts of subframes in the first resource set, the first parameter is any one parameter of the first parameter set, and the first parameter set is pre-configured by the network device.

14. The terminal according to claim 12, wherein the processor is configured to read the computer program in the memory and execute further following:

sending a first parameter and a second parameter to a physical layer of the terminal by a higher layer of the terminal;

determining, by the physical layer of the terminal, a first resource set in a first resource selection window according to the first parameter, and determining a second resource set in a second resource selection window according to the second parameter;

performing resource sensing on the first resource set to determine a first candidate resource set, and performing resource sensing on the second resource set to determine a second candidate resource set, by means of the one or more target sensing modes by the terminal, wherein the first parameter is a minimum value of amounts of subframes in the first resource set, the second parameter is a minimum value of amounts of subframes in the second resource set, the first parameter is any one parameter of the first parameter set, the second parameter is any one parameter of the second parameter set, and the first parameter set and the second parameter set are two sets pre-configured by the network device.

15. The terminal according to claim 12, wherein the processor is configured to read the computer program in the memory and execute further following:

sending a third parameter to a physical layer of the terminal by a higher layer of the terminal;

determining a first resource set in a first resource selection window and a second resource set in a second resource selection window according to the third parameter by the physical layer of the terminal;

performing resource sensing on the first resource set to determine a first candidate resource set, and performing resource sensing on the second resource set to determine a second candidate resource set, by means of the one or more target sensing modes by the terminal, wherein the third parameter is any one parameter of a third parameter set, and the third parameter set is a set preconfigured by the network device.

16. The terminal according to claim 12, wherein the processor is configured to read the computer program in the memory and execute further following:

determining an order of the first resource selection window and an order of the second resource selection window by the terminal, and/or determining a size of the first resource selection window and a size of the second resource selection window by the terminal.

17. The terminal according to claim 10, wherein the processor is configured to read the computer program in the memory and execute further following:

receiving a Proximity Communication 5 Radio Resource Control (PC5 RRC) signaling from the network device by the terminal, wherein the PC5 RRC signaling carries the resource-pool related configuration;

sending higher layer signaling to a physical layer of the terminal by a higher layer of the terminal, wherein the higher layer signaling carries the resource-pool related configuration.

18. A terminal, comprising:

a receiving circuit, configured to receive a resource-pool related configuration from a network device by the terminal; and a first determination circuit, configured to determine, by the terminal according to the resource-pool related configuration, one or more target sensing modes of resource reservation for one or more target Transport Blocks (TBs), and one or two resource selection windows corresponding to the one or more target sensing modes, wherein the resource-pool related configuration comprises:

first information configured to indicate a first resource pool;

second information configured to indicate that the first resource pool is allowed for resource sensing performed by using Period-based Partial Sensing (PBPS) and/or Contiguous Partial Sensing (CPS);

third information configured to indicate that a quantity of resource selection windows allowed to be configured for the first resource pool is one or two.

* * * * *